Patented Oct. 14, 1924.

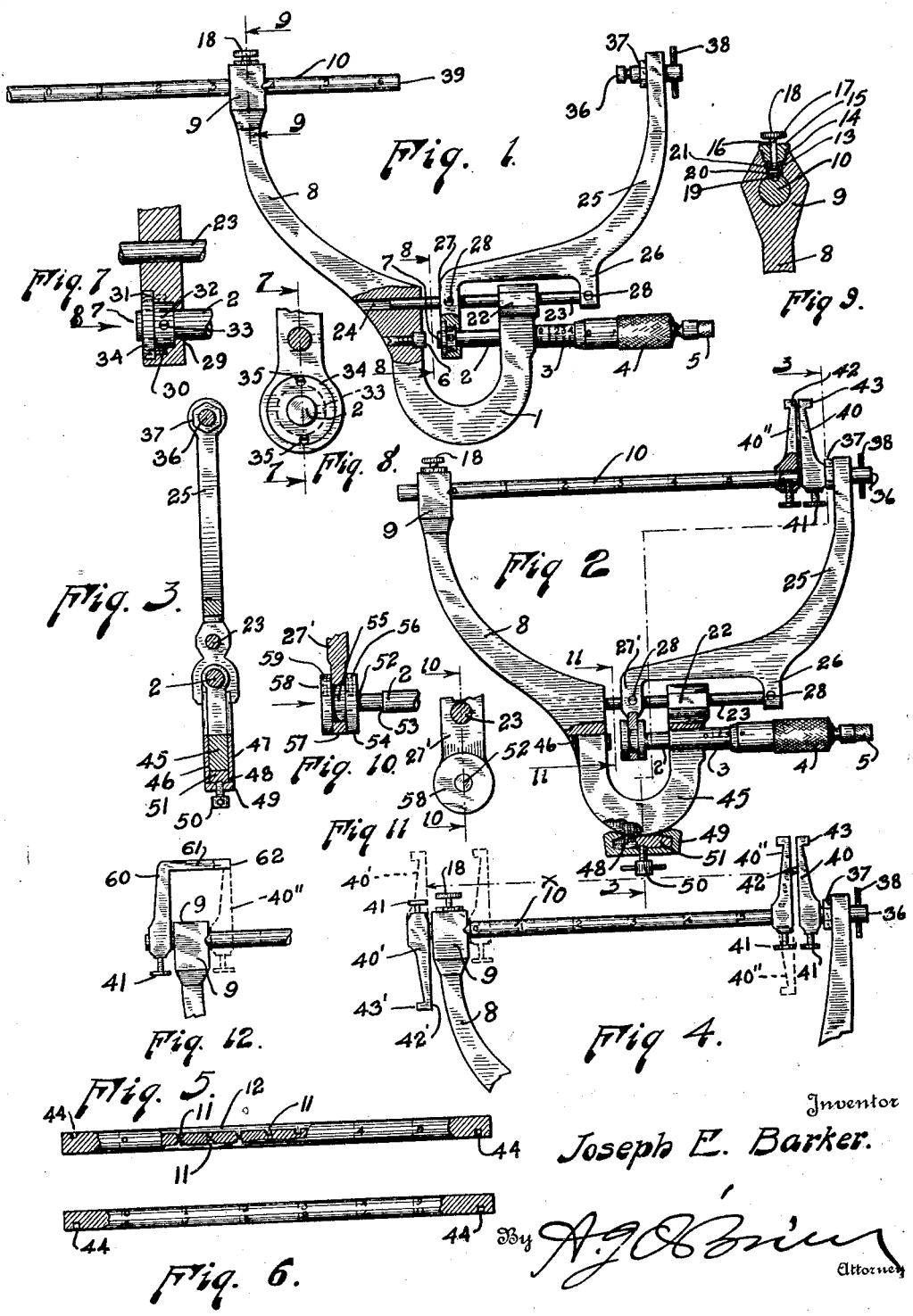
Oct. 14, 1924.  
J. E. BARKER  
MICROMETER  
Filed Aug. 7, 1922  
1,511,255
Inventor  
Joseph E. Barker.

1,511,255

UNITED STATES PATENT OFFICE.

JOSEPH E. BARKER, OF DENVER, COLORADO.

MICROMETER.

Application filed August 7, 1922. Serial No. 580,156.

*To all whom it may concern:*

Be it known that I, JOSEPH E. BARKER, a citizen of the United States, residing at the city and county of Denver and State of Colorado, have invented certain new and useful Improvements in Micrometers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in micrometers and has special reference to a micrometer that can be used to measure distances up to twelve inches and over.

The ordinary micrometer as it is usually constructed is adapted to measure comparatively short distances only. The most usual type of micrometer has a maximum capacity of about one inch, but larger micrometers are, of course, made, and there is no reason why the capacity of a micrometer constructed along the usual lines cannot be made as large as may be desired. A micrometer constructed along the ordinary lines and capable of measuring from zero to twelve inches would be very expensive, as the fine workmanship necessary would have to be many times increased.

It is the object of this invention to produce a micrometer of such construction that it will accurately measure any distance from zero to over twelve inches and still require only the ordinary micrometer stem and barrel, thus reducing the amount of fine workmanship to a minimum.

In order to more clearly describe my invention, I shall have reference to the accompanying drawing, in which Fig. 1 shows a plan view of a micrometer constructed in accordance with my invention;

Fig. 2 is a modification showing the manner in which my improvement can be applied, as an attachment, to an ordinary micrometer;

Fig. 3 is a section taken on line 3—3, Fig. 2;

Fig. 4 is a fragmentary plan view of my micrometer and shows how auxiliary caliper portions can be attached to the adjustable rod so as to adapt the micrometer for inside measuring and for outside measuring of distances greater than seven inches;

Fig. 5 is a side elevation of the adjustable measuring rod with parts thereof shown in section for the purpose of showing the holes that co-operate with the stop pin;

Fig. 6 is a side elevation of the adjustable measuring rod showing the two sets of numbers thereon;

Fig. 7 is a section taken on line 7—7, Fig. 8;

Fig. 8 is a view looking in the direction of the arrows on line 8—8, Fig. 1;

Fig. 9 is a section taken on line 9—9, Fig. 1;

Fig. 10 is a section taken on line 10—10, Fig. 11;

Fig. 11 is a view taken on line 11—11, Fig. 2; and

Fig. 12 is a view of a portion of the attachment shown in Fig. 2.

Number 1 represents the body portion of my micrometer, which is formed somewhat like that of any ordinary micrometer. 2 represents the end of the threaded stem which reciprocates in the graduated barrel 3 and is controlled by means of the rotatable handle 4, which in turn may be operated by means of the friction clutch member 5, all in the manner and for the purpose common and well known. An adjustable abutment 6 cooperates with the end 7 of the spindle 2. The stop 6 is adjusted so that the micrometer reads zero when the end 7 engages the stop. It is apparent that small pieces of material may be measured between the end of the spindle and the stop in the ordinary manner. It is my object to so construct the micrometer that it can be used to measure articles of greatly varying sizes, from zero to twelve (12) inches and over. In order to accomplish this, I provide the outer end of the body member 1 with an extension or arm 8, which is suitably curved as shown in Figs. 1 and 2 and has the end thereof slightly enlarged, as indicated at 9. The end 9 is provided with an opening for the reception of a rod 10, which fits therein with a close sliding fit. Rod 10 is provided with a number of holes 11 (Fig. 5) spaced one-half (½) inch apart. A groove 12 joins the holes 11. Two sets of holes and grooves are provided and are diametrically opposed. The purpose of this will be hereinafter explained. In order to be able to lock the rod 10 in different positions, I provide a locking means, which I have shown in section in Fig. 9 and which consists of an opening 13 whose upper end is threaded, as indicated at 14, for the reception of a threaded plug 15. An opening 16 extends axially through the plug 15 and serves to receive the stem 17 of a stop pin 18. The stem 17 extends through an opening 19 into one of the holes 11 in the rod 10 and serves to hold the same against longitudinal movement. A collar 20 is secured to the stem 17 and serves as an abutment for one end of spring 21, whose other end abuts the lower end of plug 15. When it is desired to move the rod 10, the operator grasps the cap 18 and pulls the end of the stem out of the holes 11, thus permitting the rod to be moved. The other end of the body member 1 terminates in an enlarged end 22 having an opening therein for the reception of a rod 23 whose end extends into an opening 24 in the arm 8. An arm 25 which corresponds to the arm 8 has two downwardly extending parts 26 and 27, which are apertured for the reception of the rod 23, and is clamped to said rod by means of screws 28. The downwardly extending part 27 has an opening 29 (Figs. 7 and 8) which is of the proper size to receive the stem 2. Opening 29 has two counterbored portions 30 and 31 of increasingly larger diameters. A ring 32 is secured to the stem 2 by means of a set screw 33 and is of such size that it fits within the counterbored portion 30. A washer-like member 34 fits within the counterbored portion 31 and is held in place on member 27 by means of screws 35. By the construction just described, the stem 2 and the ring 32 can be freely rotated within the member 27, but no relative longitudinal movement will be permitted, therefore arm 25 will move with the stem 2. Secured to the end of arm 25 is a stop 36 which is threadedly connected therewith and provided with a lock nut 37. The stop 36 may be rotated for adjustment purpose by means of the handle 38 and firmly locked in adjusted position by means of a lock nut 37. The stop 36 and the end 39 of rod 10 are adjusted by first placing the end 7 of the stem 2 in contact with stop 6. Rod 10 is then placed with the end of stem 17 in the hole 11 corresponding to zero, and stop 36 adjusted so that it contacts with the end 39 of bar 10. When adjusted as just described, the distance between jaws 36 and 39 will be the same as between 6 and 7. The micrometer should be so constructed that the stem 2 will have a movement of one inch plus the distance from the right hand side of member 27 to the end of the stem; this will permit the micrometer stem to move one inch. When it is necessary to measure more than one inch, the rod 10 is moved to the left a distance of one-half or one inch, preferably the latter. The size of the piece will then be one inch plus the reading of the micrometer. If the distance to be measured lies between two and three inches, the rod 10 is moved to the left another inch so that the distance between points 39 and 36 will be two inches when the micrometer is adjusted to zero, and the actual distance between points 36 and 39 will be two inches plus the micrometer reading. In the manner described, the rod 10 can be moved to the left by half inch or full inch movements until the distance from stop 36 to the end 39 of the rod is six inches when the micrometer reads zero. When the micrometer stem moves to the right, the space between points 36 and 39 will increase until it becomes seven inches, where the movement of stem 2 is one inch. It is therefore apparent that a micrometer constructed as shown in Fig. 1 is capable of measuring accurately any distance from zero to seven inches. When distances greater than seven inches are to be measured, it becomes necessary to apply auxiliary caliper jaws to the stop 36 and to the end of rod 10 in the manner shown most clearly in Fig. 4. A jaw member 40 is secured to the stop 36 by means of a set screw 41. Jaw member 40 has a straight face 42 and a projecting portion 43 which can be employed for inside measuring. A similar jaw piece 40' having a flat face 42' and a projecting portion 43' is secured to the outer, or left hand, end of rod 10 by means of a clamping screw 44, which engages in one of the holes 44 in the end of the rod. The jaw 40' is so adjusted that when the micrometer reads zero and the right hand end 39 of rod 10 is in contact with the face 42 of jaw 3, the distance X between the faces 42 and 42' will be exactly seven (7) inches. With the jaw 40' in the position described, the micrometer will measure from 7 to 8 inches, after which the rod 10 will have to be moved one inch to the left, when the micrometer will be in position to measure 8 to 9 inches. As rod 10 can be moved six (6) inches to the left, the micrometer will have a maximum capacity for outside measurement of fourteen (14) inches. The distance from face 42 to 43 is one-quarter (¼) of an inch and therefore the distance from face 43 to 43' will always be one-half (½) inch greater than the distance between faces 42 and 42'. In order to be able to measure inside diameters of one-half (½) inch or more, I apply to the right hand end of the bar 10 a jaw 40″, which is similar in every respect to those already described; this jaw member points in the opposite direction from jaw member 40′ in order that jaw 40″ may be turned out of the way when jaws 40 and 40′ are to be used (see Fig. 4).

In Fig. 2 I have shown my invention constructed in the form of an attachment and applied to an ordinary micrometer 45 of one inch capacity. In order to attach my improvement to the micrometer, I mill a slot 46 through the body member 1 of the proper size and shape to receive the micrometer 45 with a snug fit. The sides 46 and 47 are each provided at their lower ends with a projection 48 which is so shaped that it will receive a clamping member 49, which has threadedly secured thereto a screw 50 which engages a loose piece 51 which is held in place between the projecting portions 48 and and serves to transmit the force of the screw 50 to the micrometer and to clamp the latter securely in place. The arm 27′ is constructed somewhat different from the corresponding arm 27 shown in Fig. 1. The difference between arms 27 and 27′ is due to the specifically different manner in which the connection is made between it and the stem 2. Since it is desirable and necessary, at times, to remove the attachment from the micrometer, the connection between the stem 2 and the arm 27′ must be made in such a manner that the stem can be readily freed, and this I accomplish in the following manner. The stem 2 should preferably have the outer end 52 thereof reduced in diameter so as to provide a shoulder 53 as shown in Fig. 10. A member 54 having a central hub 55 has an axial opening which fits the reduced portion 52 and can be clamped thereto by a set screw 56. The end 57 of the arm 27′ is flattened and provided with a hole of such a size that it will receive the hub 55. A ring-like member 58 fits about the end of the stem 2 and serves to hold the part 57 from longitudinal movement on the reduced portion 52 and is held in place by a set screw 59. By means of the construction just described, the arm 27′ is connected to the stem 2 in such a manner that the latter may freely rotate and move the arm 27 longitudinally as it rotates. It is apparent that the device shown in Fig. 2 is very similar to that in Fig. 1 and is capable of the same operations. There is one important distinction, however, between the device in Fig. 1 and that shown in Fig. 2, and that is that in the micrometer shown in Fig. 1 the stem 2 has a movement of one inch, whereas in the arrangement shown in Fig. 2 the micrometer 45 has a free movement of about three-quarters (¾) of an inch, due to the fact that the parts 56 and 58 take up about one-quarter (¼) of an inch of space. Owing to the fact that in the attachment the maximum movement of the micrometer is less than one inch, it is of course necessary that the rod 10 be moved less than one inch at a time, and I have therefore provided the rod with holes 11 spaced half an inch apart. Owing to the fact, pointed out above, that the micrometer moves less than one inch, the maximum capacity of the attachment when arranged as shown in Fig. 2 or in Fig. 1 is less than seven inches, being more nearly six and one-half (6½) inches, whereas if a jaw 40′ were attached to the outer or left hand end of the rod in the manner shown in Fig. 4, there would be a length between 6½ and 7 inches that could not be measured. In order to be able to measure any length within the capacity of the micrometer, I provide on the outer end of bar 10 a jaw 60 (Fig. 12) which has a horizontally projecting portion 61 of such length that it extends over the end 9 and to the right such a distance that the tip 62 thereof coincides with the plane of the jaw 40 when it is in its extreme left hand position. By the construction just described, it is of course possible to continue with the jaw 60 the measurement of any distance above the capacity of the jaw 40″ and within the capacity of the instrument. By the micrometer shown I can measure the diameter of a cylindrical member up to the capacity of jaws 40 and 40″, or about seven (7) inches. For anything over 7 inches straight pieces only can be measured, as the diameter of a round shaft can only be measured as long as it is not too large to fit between the arms 8 and 25.

Although I have shown an annular shoulder 53 in Fig. 10 and referred to the same in the description thereof, I want to explain that this shoulder is not necessary and that in many cases it can be dispensed with. The construction illustrated in Figs. 10 and 11 is to be used where my device is to be employed as an attachment, and therefore I prefer in most cases to use the micrometer stem 2 without the shoulder 53, as this requires additional labor. The member 54, when it has once been attached to the micrometer stem, does not need to be removed, as the attachment can be removed by removing the washer 58. Although I have shown the washer 58 held in place by means of a set screw 59, I may hold the same in place by any suitable means, and the set screw 59 has merely been shown as an example. Referring now to Fig. 6, I wish to call attention to the fact that the numbering 6 to 11 is for the attachment shown in Fig. 2, and when the bar is to be employed with the arrangement of jaws shown in Fig. 4, the numbers 6 to 11 must be changed to 7 to 12.

From the above it will appear that I have devised a micrometer that can be used to measure accurately any distance up to twelve inches and which can be employed for inside as well as outside measurements. It will be noted that the micrometer screw needs to have a range of movement only slightly over one inch to effect the measurements of any distance up to twelve inches. My micrometer construction is such that it may be adapted to be used as an attachment to a micrometer of ordinary construction and sold as such to mechanics who are provided with ordinary micrometers. I want to call particular attention to the fact that my micrometer has a plurality of sets of jaws, to-wit: 6 and 7, 36 and 39, and 40 and 40', one set being adjustable independently of the other. Thus, the jaws 36 and 39 can be changed without changing the distance between jaws 6 and 7, as by this means I am able to take a micrometer having a maximum capacity of one inch and measure distances from zero to over twelve (12) inches.

Having now described my invention, what I claim as new is:

1. A micrometer comprising in combination a body member having a U-shaped portion, a stop on one side of said U, a micrometer stem secured to the other side of the U and adapted to cooperate with said stop, one arm of the said U-shaped body member being extended and outwardly curved, an opening in the end of said curved member, a rod slidable in said opening, a second arm slidably connected with said U-shaped body member, means connecting said second arm to said micrometer stem whereby movement of the latter will move the former, and a stop carried by the said slidable arm and adapted to cooperate with the end of the rod for measuring purposes.

2. A micrometer comprising in combination a body member having a U-shaped portion, a stop on one side of said U, a micrometer stem secured to the other side of the U and adapted to cooperate with said stop, one arm of the said U-shaped body member being extended and outwardly curved, an opening in the end of said curved member, a rod slidable in said opening, a rod extending through an opening in one of the arms of the U-shaped body member and projecting into an opening in the opposing arm thereof, a curved arm secured to said last named rod, means for clamping said arm to said rod, the arm having a member extending into the path of the micrometer stem, and means for rotatably but non-slidably securing said last mentioned member to said stem.

3. A micrometer comprising a U-shaped body member, a micrometer stem movably mounted in one side of said member each of the sides of said body member having an opening, a pin slidably mounted in said openings, means connecting said pin with the micrometer stem whereby the latter will move the former, and an auxiliary arm secured to said pin.

4. A micrometer comprising a U-shaped body portion having one side longer than the other, the portion of the longer side that extends beyond the top of the shorter side of the U being curved away from the short side, a micrometer stem adjustably connected to one side of the U-shaped member, an adjustable stop secured to the other side of the U-shaped member and adapted to cooperate with the end of the micrometer stem, a rod slidably connected with the longer side near the end thereof, said rod having its axis parallel with the axis of the micrometer stem and a jaw member operatively connected with the micrometer stem, said jaw member being adapted to cooperate with the end of the slidable rod for measuring purposes.

5. A micrometer comprising a U-shaped body portion having one side longer than the other, the portion of the longer side that extends beyond the top of the shorter side of the U being curved away from the short side, a micrometer stem adjustably connected to one side of the U-shaped member, an adjustable stop secured to the other side of the U-shaped member and adapted to cooperate with the end of the micrometer stem, a rod slidably connected with the longer side near the end thereof, said rod having its axis parallel with the axis of the micrometer stem, a jaw member operatively connected with the micrometer stem, said jaw member being adapted to cooperate with the end of the slidable rod for measuring purposes, and means on the sliding rod and on the longer side of the U-shaped member to permit the rod to be accurately adjusted a predetermined distance.

6. A micrometer comprising a U-shaped body portion having one side longer than the other, the portion of the longer side that extends beyond the top of the shorter side of the U being curved away from the short side, a micrometer stem adjustably connected to one side of the U-shaped member, an adjustable stop secured to the other side of the U-shaped member and adapted to cooperate with the end of the micrometer stem, a rod slidably connected with the longer side near the end thereof, said rod having its axis parallel with the axis of the micrometer stem, a jaw member operatively connected with the micrometer stem, said jaw member being adapted to cooperate with the end of the slidable rod for measuring purposes, and means on the sliding rod and on the longer side of the U-shaped member to permit the rod to be accurately adjusted a predetermined distance, said means comprising a rod having a plurality of spaced notches in the side thereof and a screw secured to the longer side and adapted to engage one of said notches.

7. A micrometer comprising a U-shaped body member one side of which is prolonged and curved, a micrometer stem adjustably mounted in one side of said U-shaped member, a jaw member operatively connected with the micrometer stem and a cooperating jaw member slidably connected to the end of the prolonged member.

In testimony whereof I affix my signature.

JOSEPH E. BARKER.